(12) United States Patent  
Yamaguchi et al.

(10) Patent No.: US 7,325,639 B2  
(45) Date of Patent: Feb. 5, 2008

(54) FENDER STRUCTURE FOR MOTORCYCLE

(75) Inventors: Takashi Yamaguchi, Saitama (JP); Naoki Urano, Saitama (JP); Akinori Hirano, Saitama (JP); Hiroki Sakata, Saitama (JP); Yoshiyuki Ishiguri, Saitama (JP); Yasuhiro Uchiike, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 375 days.

(21) Appl. No.: 11/171,361

(22) Filed: Jul. 1, 2005

(65) Prior Publication Data

US 2006/0000652 A1    Jan. 5, 2006

(30) Foreign Application Priority Data

Jul. 2, 2004    (JP) .............................. 2004-197392

(51) Int. Cl.  
*B62K 11/00* (2006.01)

(52) U.S. Cl. ..................... 180/219; 280/160.1; 280/852

(58) Field of Classification Search ................ 180/219; 280/160.1, 852  
See application file for complete search history.

(56) References Cited

U.S. PATENT DOCUMENTS 4,354,570 A    10/1982    Tanaka et al.

| | | | |
|---|---|---|---|
| 6,860,353 B2* | 3/2005 | Miyashiro | 180/227 |
| 7,174,984 B2* | 2/2007 | Kosugi et al. | 180/219 |
| 2003/0121708 A1 | 7/2003 | Laivins et al. | |
| 2005/0263334 A1* | 12/2005 | Okabe et al. | 180/219 |

FOREIGN PATENT DOCUMENTS

| | | |
|---|---|---|
| DE | 296 07 518 | 9/1996 |
| DE | 203 15 271 U1 | 1/2004 |
| JP | 62-35673 Y2 | 9/1987 |

* cited by examiner

*Primary Examiner*—George B. Nguyen  
*Assistant Examiner*—Michael Stabley  
(74) *Attorney, Agent, or Firm*—Birch, Stewart, Kolasch & Birch, LLP

(57) ABSTRACT

A fender assembly is divided into an upper fender and a lower fender with a air guide port being formed in the upper fender wherein the entry of muddy water splashed up in a tangential line direction by a front wheel into the air guide port is prevented and the size of the upper fender is reduced. An upper fender is secured to upper forks of the front forks, while a lower fender is secured to lower forks. The upper fender is disposed in a range in which muddy water is blocked by the lower fender. An air guide port is formed in the upper fender and an air guide path is formed by a fender recess extending forward of the air guide port and a lower portion of a visor which covers the fender recess from above.

20 Claims, 13 Drawing Sheets

FENDER STRUCTURE FOR MOTORCYCLE

CROSS-REFERENCE TO RELATED APPLICATIONS

The present application claims priority under 35 USC 119 to Japanese Patent Application No. 2004-197392 filed on Jul. 2, 2004 the entire contents of which are hereby incorporated by reference.

FIELD OF THE INVENTION

The present invention relates to a fender structure for a motorcycle and more particularly to a fender structure for a motorcycle including a vertically divided upper fender and lower fender, with an air guide port for guiding a flow of air to an engine being formed in the upper fender.

DESCRIPTION OF BACKGROUND ART

A fender structure is known wherein an upper fender extends to both the front and rear sides of a front fork with a plurality of air guide ports for guiding a flow of air to an engine being formed in the upper fender at positions close to a front end of the upper fender and with a lower fender extending rearwardly from the front fork. See, Japanese Utility Model Publication No. Sho 62-35673.

In the above structure, the air guide ports that are formed outside the range in which muddy water is splashed up in a tangential line direction by a front wheel can be blocked by the lower fender. Thus, there is a fear that muddy water splashed by the front wheel may get into the air guide ports. Therefore, it has been demanded to avoid such an inconvenience. Accordingly, it is an object of the present invention to satisfy such a demand.

SUMMARY AND OBJECTS OF THE INVENTION

For solving the above-mentioned object, according to an embodiment of the invention, a motorcycle includes a pair of right and left front forks which support a front wheel with a fender which covers an upper portion of the front wheel, and an engine supported by a body frame at a position behind the front forks. The front forks each including an upper fork as a portion fixed to the body frame and a lower fork as a portion fixed to the front wheel with the fender including a vertically divided upper fender and lower fender. The upper fender is secured to the upper forks and the lower fender is secured to the lower forks. The fender structure includes an air guide port for guiding a flow of air to the engine that is formed in the upper fender with the air guide port being positioned within the range in which muddy water splashed up in a tangenial line direction by the front wheel is blocked by the lower fender.

According to an embodiment of the invention, a fender structure for a motorcycle is provided wherein a visor so as to be superimposed on the upper fender with a lower surface of the visor covering a part of an upper surface of the upper fender and a part of a fender recess formed in front of the air guide port. An air guide path for guiding a flow of air to the air guide port is formed by the fender recess and a lower portion of the visor.

According to an embodiment of the invention, a fender structure is provided for a motorcycle wherein a front end of the lower fender is positioned between a front end of the upper fender and the air guide port.

According to an embodiment of the invention, a fender structure for a motorcycle is provided wherein the lower fender is curved along an outer periphery of the front wheel from near the top of the front wheel and extends rearwardly.

According to an embodiment of the invention, a fender structure for a motorcycle is provided wherein the upper fender gradually becomes wider from the front side of the vehicle towards the front forks so as to cover front portions of the front forks and both side surfaces of the upper fender expand upwardly.

According to an embodiment of the invention, the air guide port formed in the upper fender is positioned within the range in which muddy water is splashed up in a tangential direction by the front wheel and is blocked by the lower fender. Therefore, by guiding a flow of air to the engine through the air guide port formed in the upper fender, not only is the engine cooling efficiency improved, but also muddy water splashed up by the front wheel can be prevented from entering the air guide port.

According to an embodiment of the invention, since an air guide path connected to the air guide port is provided, the flow of air introduced into the air guide port is given directivity, thereby permitting the flow of air to be guided to the engine efficiently. Thus, the engine cooling performance is improved.

According to an embodiment of the invention, the upper portion of the air guide path is formed by the lower surface of the visor and the lower portion thereof is formed by the fender recess formed in the upper surface of the upper fender. Therefore, despite the air guide path being hollow, the air guide path can be formed by molding with use of a simple mold not requiring a core.

According to an embodiment of the invention, since the front end of the lower fender is positioned between the front end of the upper fender and the air guide port, the size of the upper fender can be reduced while preventing the entry of muddy water into the air guide port. In addition, since the upper fender positioned in front of the engine is reduced in size, it becomes easier to conduct a flow of air to the engine.

According to an embodiment of the invention, since the fender is constituted by divided upper and lower fenders, each fender can be reduced in size. In addition, since the front end of the lower fender extends up to near the top of the front wheel, the upper fender need not be extended forwardly, whereby the upper fender can be made still smaller in size and it becomes easier to send a flow of air to the engine.

According to an embodiment of the invention, since side surfaces of the upper fender are expanded upwardly to increase the side area, a flow uniforming surface becomes larger and a larger amount of a flow of air can be made uniform. Moreover, since the upper fender covers the front portions of the front forks, the flow of air which has been made uniform by the side surfaces of the upper fender can be allowed to flow smoothly to the engine without striking against the front forks.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
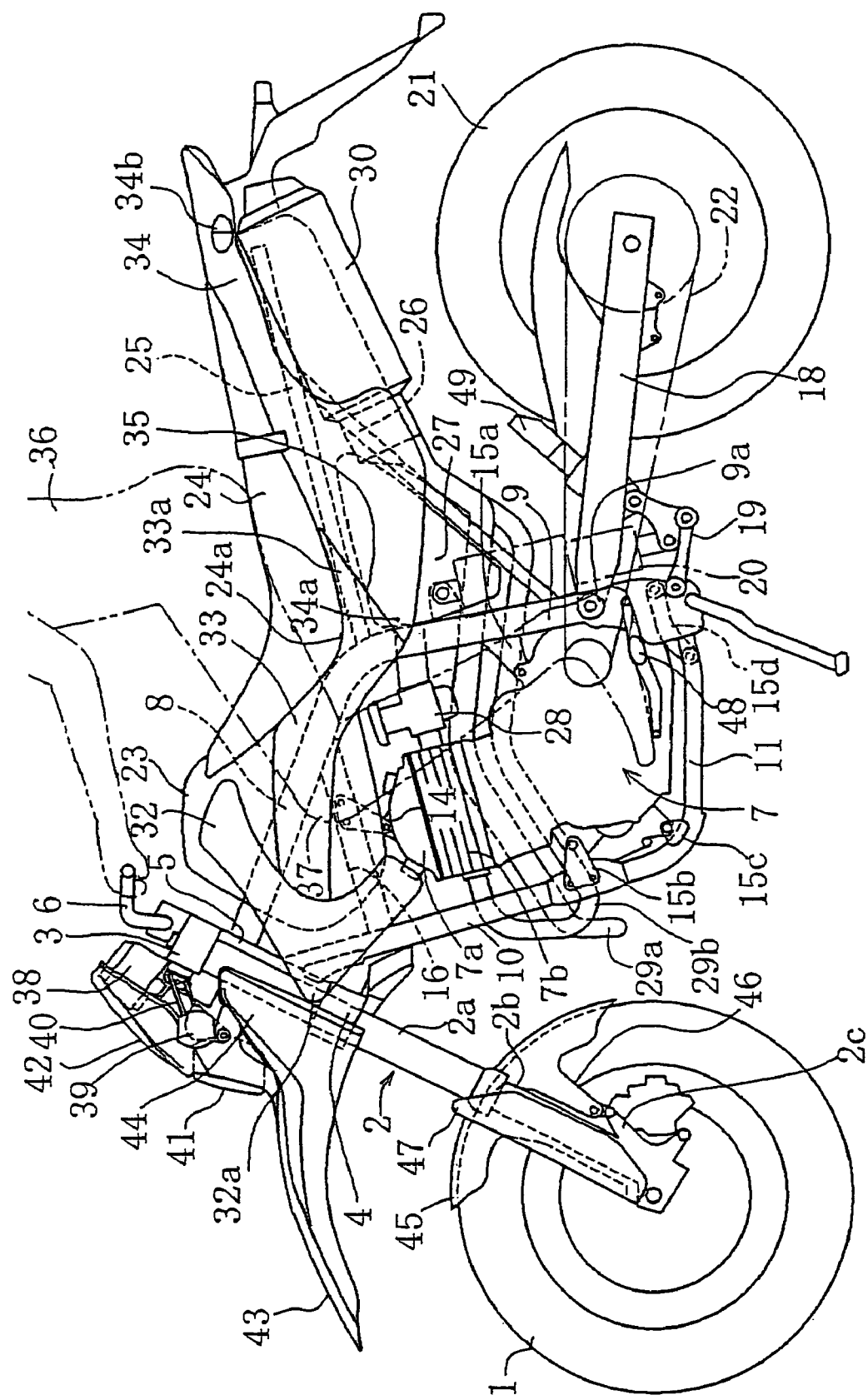
FIG. 1 is a side view of a motorcycle to which the present invention is applied.

Embodiments of the present invention will be described hereinunder. FIG. 1 is a side view of an off-road type motorcycle to which the present invention is applied. A pair of right and left front forks support a front wheel 1 at their lower end portions and are vertically disposed right and left in a pair. Upper portions of the front forks 2 are pivotably supported by a head pipe 5 through a top bridge 3 and a bottom bridge 4 and are steered by a handlebar 6 fixed to the top bridge 3.

The head pipe 5 is provided at a front end of a body frame which supports an engine 7. The body frame includes a main pipe 8 extending above the engine 7 and obliquely downwardly and rearwardly from the head pipe 5. A center pipe 9 is connected to a rear end of the main pipe 8 and extends downwardly behind the engine 7 with a down pipe 10 extending obliquely downwardly and rearwardly from the head pipe 5 to the front side of the engine 7. A lower pipe 11 extends rearwardly below the engine 7 from a lower end of the down pipe 10 and is connected to a lower end of the center pipe 9.

The engine 7 is an air-cooled four-cycle engine that is supported by the body frame through engine hangers 14, 15a, 15b, 15c and 15d. An upper end of the engine hanger 14 is secured to a reinforcing pipe 16 which connects the main pipe 8 and the down pipe 10 with each other obliquely, while a lower end of the engine hanger 14 is secured to the top of a cylinder head cover 7a of the engine 7.

A pivot 9a is provided at an intermediate position of the center pipe 9 and a front end portion of a rear swing arm 18 is supported pivotably by the pivot 9a. A cushion link 19 is disposed between a front lower portion of the rear swing arm 18 and the lower end portion of the center pipe 9 with a cushion unit 20 for rear suspension being disposed between the cushion link 19 and an upper portion of the center pipe 9. A rear wheel 21 is supported by a rear end portion of the rear swing arm 18 and is driven by the engine 7 through a chain 22.

A fuel tank 23 is supported by the main pipe 8 and a tandem seat 24 is disposed behind the fuel tank 23. The tandem seat 24 is supported by a seat rail 25 which extends obliquely upwardly and rearwardly from the upper portion of the center pipe 9. The seat rail 25 is reinforced by a rear stay 26 which connects a rear portion of the seat rail 25 and a lower portion of the center pipe 9 with each other.

An air cleaner 27 is disposed under the tandem seat 24 and clean air is fed through a carburetor 28 to a cylinder head 7b of the engine 7. Two exhaust pipes 29a and 29b extend forward from the front side of the cylinder head 7b, then bend and extend rearwardly, and are connected to a pair of mufflers 30 which are disposed right and left of a rear lower portion of the tandem seat 24.

Side surfaces of the fuel tank 23 are covered with tank shroud front portions 32 and tank shroud rear portions 33. The tank shroud front and rear portions 32, 33 are integral with each other and are molded using a suitable material such as resin into a single tank shroud.

The tank shroud front portions 32 are generally dogleg-shape in a side view and cover side surfaces of the fuel tank 23 from front side surfaces up to near the cylinder head cover 7a. Their front end portions 32a, as foremost portions, partially overlap the upper portions of the front forks 2 in a side view.

The tank shroud rear portions 33 cover side surfaces of the fuel tank 23 elongatedly from the front to the rear side between the tank shroud front portions 32 and the tandem seat 24 and their rear portions 33a extend below a front end portion, i.e., a lowest portion 24a in side view, of the tandem seat 24 and are connected to front end portions 34a of rear covers 34.

The connected portions of the rear portions 33a and the front end portions 34a constitute flushly connected mating portions 35, which are positioned under a front portion of the tandem seat 24 which lies behind knees 37 of a rider 36. With this arrangement, the mating portions 35 contact neither the knees 37 nor leg portions that underlie the knees, thereby keeping a good touch free of any difference-in-height feeling with respect to the vehicle body side.

The rear covers 34 are formed of a suitable material such as resin and cover upper side surfaces of the vehicle body up to the rear portion under the tandem seat 24. A pair of right and left members 34b are rear winkers projecting sideways and outwardly from right and left side surfaces of rear end portions of the rear cover 34.

The front forks 2, which are an inverted type, each include an upper fork 2a supported by the body frame side through the head pipe 5 and a lower fork 2b mounted to the front wheel 1. Meters 38 are supported by the top bridge 3. Front winkers 39 are mounted through winker brackets 40. A headlight 41 is supported by lower end portions of the winker brackets 40. The meters 38 and the headlight 41 are covered with a visor 42.

A lower portion of the visor 42 overlaps an upper surface of an upper fender 43. The upper fender 43 is formed of a suitable material such as resin and is secured to the bottom bridge 4 of the upper forks 2a. Side surfaces of the upper fender 43 serve as cover portions 44 which partially cover the upper forks 2a.

A lower fender 45 is secured to the lower forks 2b. The lower fender 45, which is formed of a suitable material such as resin and partially covers an upper portion of the front wheel 1. Downwardly extending mounting portions 46 thereof are secured to stays 2c extending from under the lower forks 2b. A part of the lower fender 45 serves as a cover portion 47 which covers the lower forks 2b.

Figure 2:
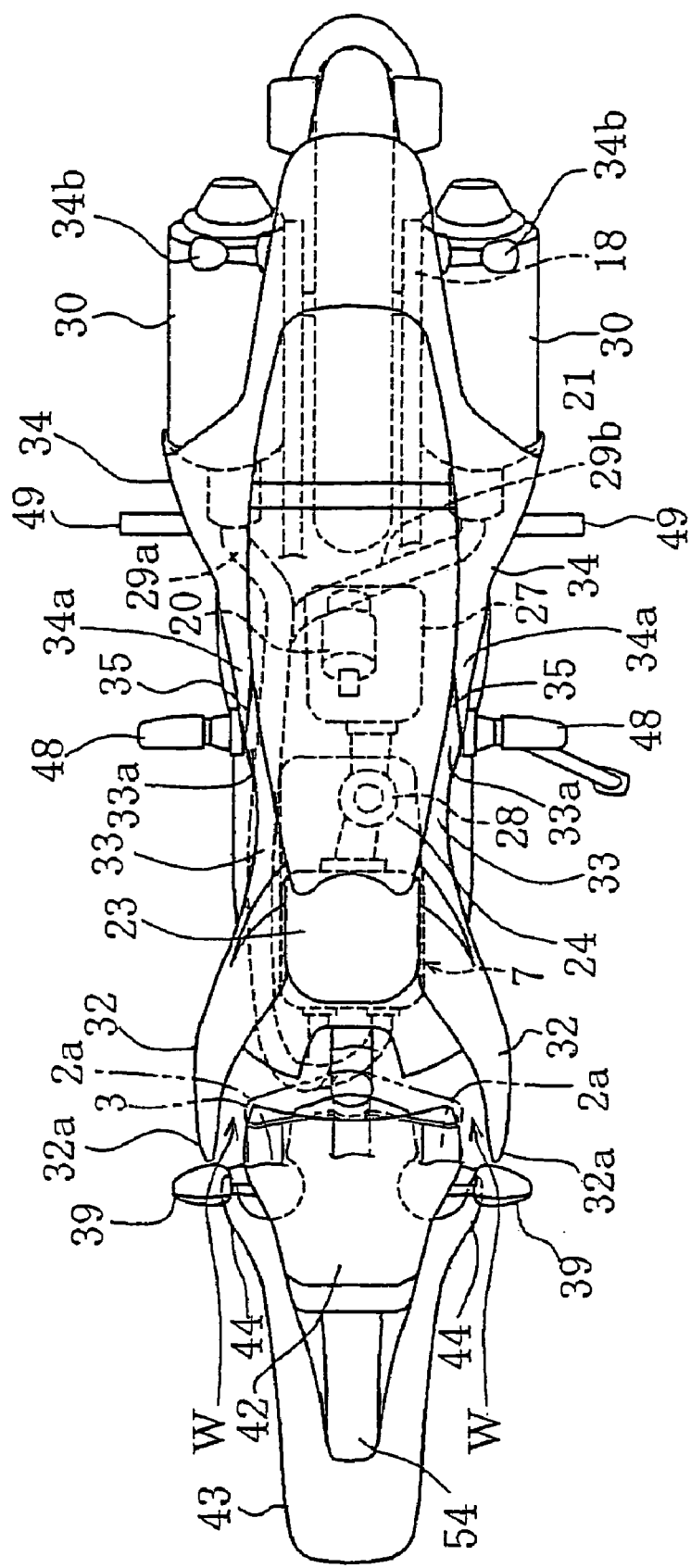
FIG. 2 is a plan view of the motorcycle.

FIG. 2 is a plan view of the motorcycle in question. The tank shroud front portions 32 are in a pair of right and left portions and expand forward in a generally V-shape. Front end portions 32a of the tank shroud front portions 32, when seen in plan, are positioned near the front winkers 39, allowing a flow of air (arrow W) which has passed the right and left side surfaces of the upper fender 43 to be introduced inside the tank shroud front portions 32.

The mating portions 35 are positioned near rider steps 48. FIG. 2 shows an open state of a pillion step 49 and FIG. 1 shows a closed state.

The exhaust pipes 29a and 29b pass the right side of the vehicle body almost conjointly and extend in the longitudinal direction of the vehicle body, then at the rear portion of the vehicle body one exhaust pipe 29b branches to the left side and respective rear ends are connected to the pair of mufflers 30 disposed on the right and left sides of the vehicle body.

Figure 3:
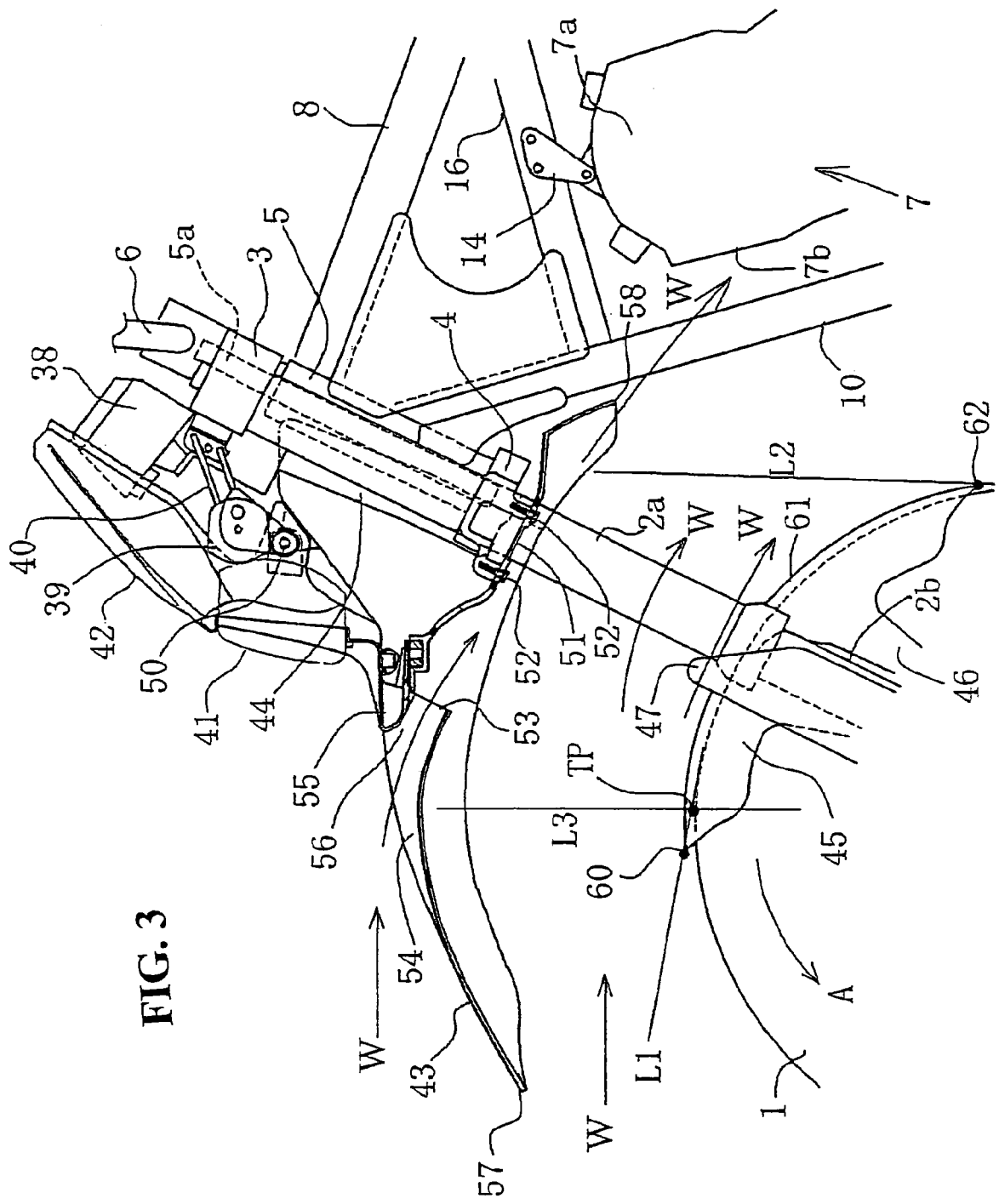
FIG. 3 is a side view of a principal portion of the motorcycle.

FIG. 3 is an enlarged and partially broken-away side view of the fender portions in FIG. 1. Both right and left sides of the visor 42 are secured with bolts 50 to end portions of the winker brackets 40 together with the cover portions 44 of the upper fender 43. A lower surface of the visor 42 is engaged and united with the upper surface of the upper fender 43 (a detailed description will be given later). A mounting portion 51a is provided in a rear portion 51 of the upper fender 43. The mounting portion 51a is superimposed from below onto the bottom bridge 4 and is secured thereto with bolts 52, whereby the upper fender 43 pivots together with the front forks 2. A steering shaft 5a is provided which is supported by the head pipe 5 through bearings.

An air guide port 53 which is open in a forward direction is formed in an intermediate position of the upper fender 43.

A fender recess 54 is formed longitudinally in front of the air guide port 53. The fender recess 54 is open upwardly and a lower portion 55 of the visor 42 covers the vicinity of the air guide port 53. An air guide path 56 is formed between the lower portion 55 and the fender recess 54.

A flow of air W enters the air guide path 56 along the fender recess 54, then is given directivity in the air guide path 56 so as to advance toward the engine 7 and passes the air guide port 53, then flows rearwardly below the upper fender 43 to cool the engine 7.

A front end 60 of the lower fender 45 is positioned near the top TP of the front wheel 1. More exactly, the front end 60 somewhat overpasses the top TP forward and assumes a rear position with respect to a front end 57 of the upper fender 43. An intermediate portion 61 of the lower fender 45 extends rearwardly while describing a circular arc along the upper portion of the front wheel 1. A rear end 62 of the lower fender 45 assumes almost the same position as a rear end 58 of the upper fender 43. The rear end 58 is positioned approximately in front of the cylinder head cover 7a.

Lines L1 and L2 are tangential lines of the front wheel 1 passing through the front end 60 and the rear end 62, respectively. The air guide port 53 is formed in the upper fender 43 so as to be positioned between the tangential lines L1 and L2. More particularly, the front end 60 is set so as to be positioned between the front end 57 and the air guide port 53. Line L3 is a perpendicular line passing through the top TP of the front wheel 1. The front end 57 and the air guide port 53 are positioned in front and in the rear with respect to the perpendicular line L3.

Figure 4:
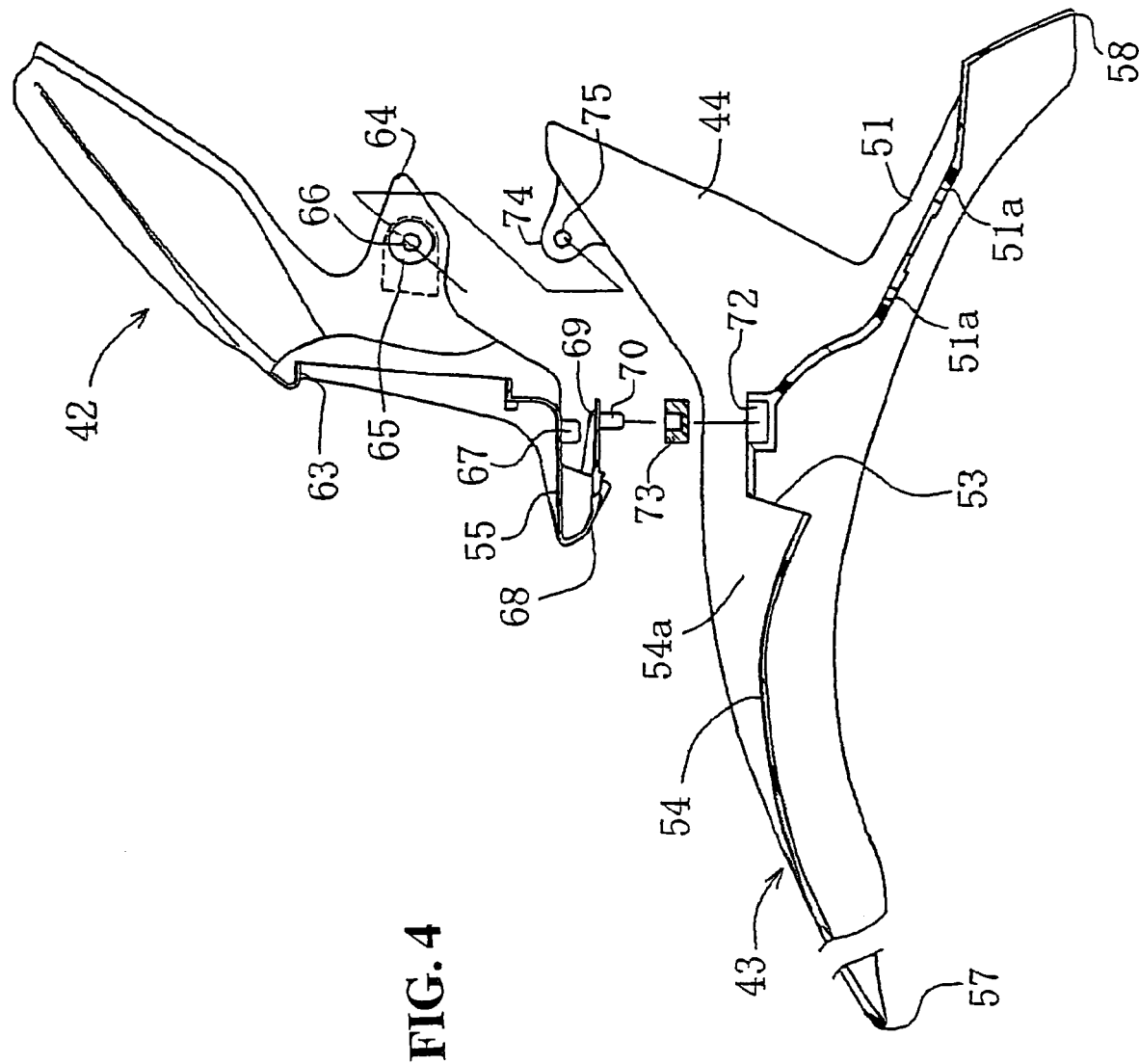
FIG. 4 is an assembly diagram of a visor and an upper fender.

FIG. 4 is an assembly diagram showing the visor 42 and the upper fender 43 in FIG. 3 separately from each other. The visor 42 has an aperture 63 for the headlight 41 formed centrally of its front surface. Rearwardly projecting mounting portions 64 are provided right and left of rear portions of side surfaces of the visor 42, and mounting seats 65 are provided in the mounting portions 64. A through hole 66 is provided.

The lower portion 55 of the visor 42 overlaps the upper surface of the upper fender 43 and projects downwardly. Retaining tongue pieces 67 are formed integrally on both right and left sides of the lower portion 55. A transversely central part of the lower portion 55 is bent in a generally U-shape in section to constitute a flow uniforming surface 68, and mounting pieces 69 project rearwardly from both right and left sides of a rear portion of the flow uniforming surface 68. Downwardly projecting, engaging projections 70 are formed integrally with rear ends of the mounting pieces 69.

An upper portion of the air guide port 53 in the upper fender 43 is formed as a stepped portion 71 which the flow uniforming surface 68 overlaps. Bosses 72 of an upwardly open concave shape are formed behind the stepped portion 71. The engaging projections 70 are retained in the bosses 72 through rubber cushions 73 which are fitted in the bosses 72.

Forwardly projecting mounting portions 74 are provided at upper positions of the right and left cover portions 44 and are superimposed on the insides of the mounting portions 64 in such a manner that through holes 75 formed in the mounting portions 74 are aligned with the through holes 66 formed in the mounting seats 65.

Figure 5:
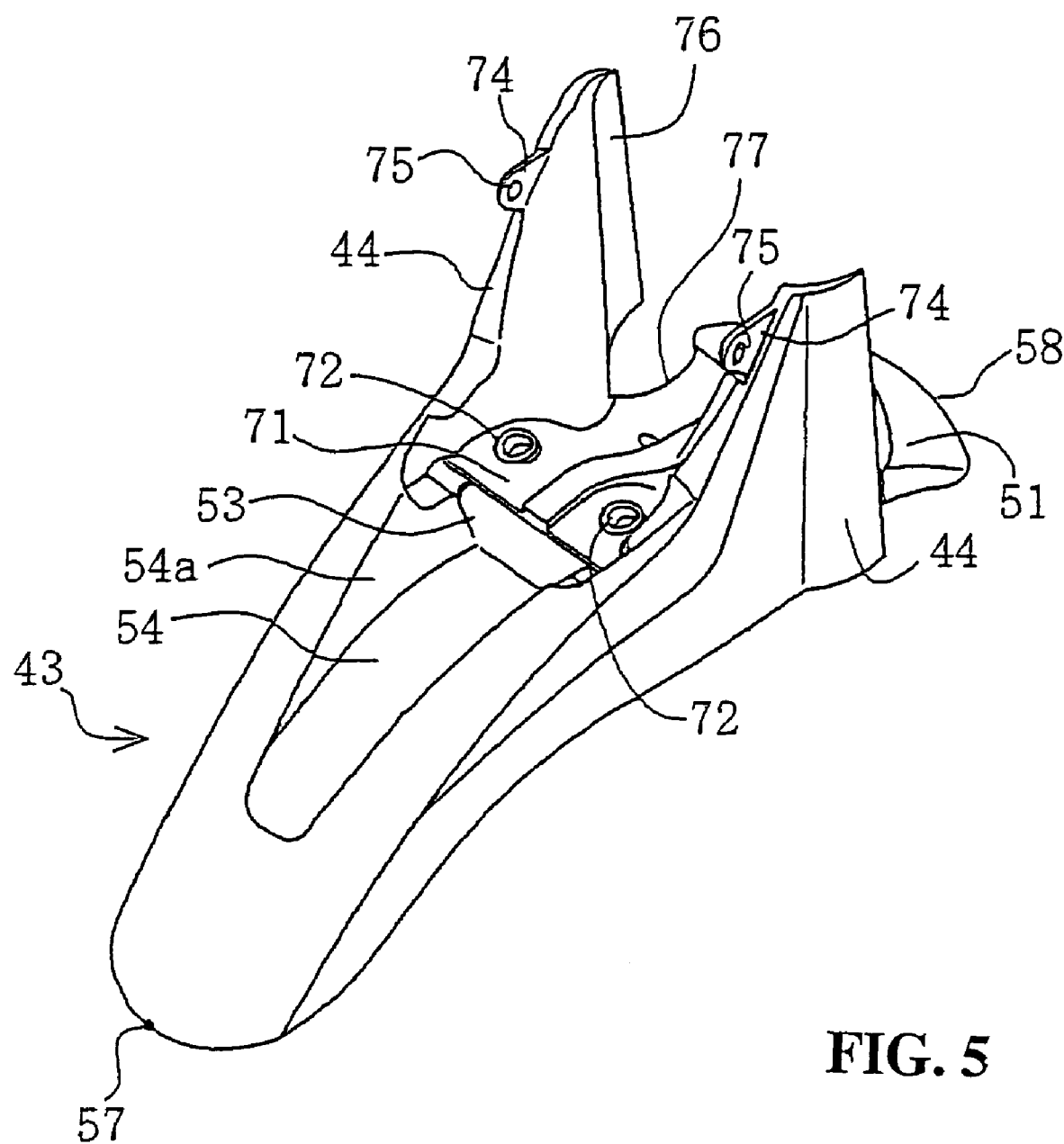
FIG. 5 is a perspective view of the upper fender.

FIG. 5 is a perspective view of the upper fender 43. The fender recess 54 is formed centrally of the upper surface of the upper fender 43 and extends longitudinally and forwardly. Both right and left side walls 54a of the fender recess 54 become gradually wider toward the air guide port 53. The cover portions 44 project upwardly and their inner surfaces are formed as curved surfaces 76.

Figure 6:
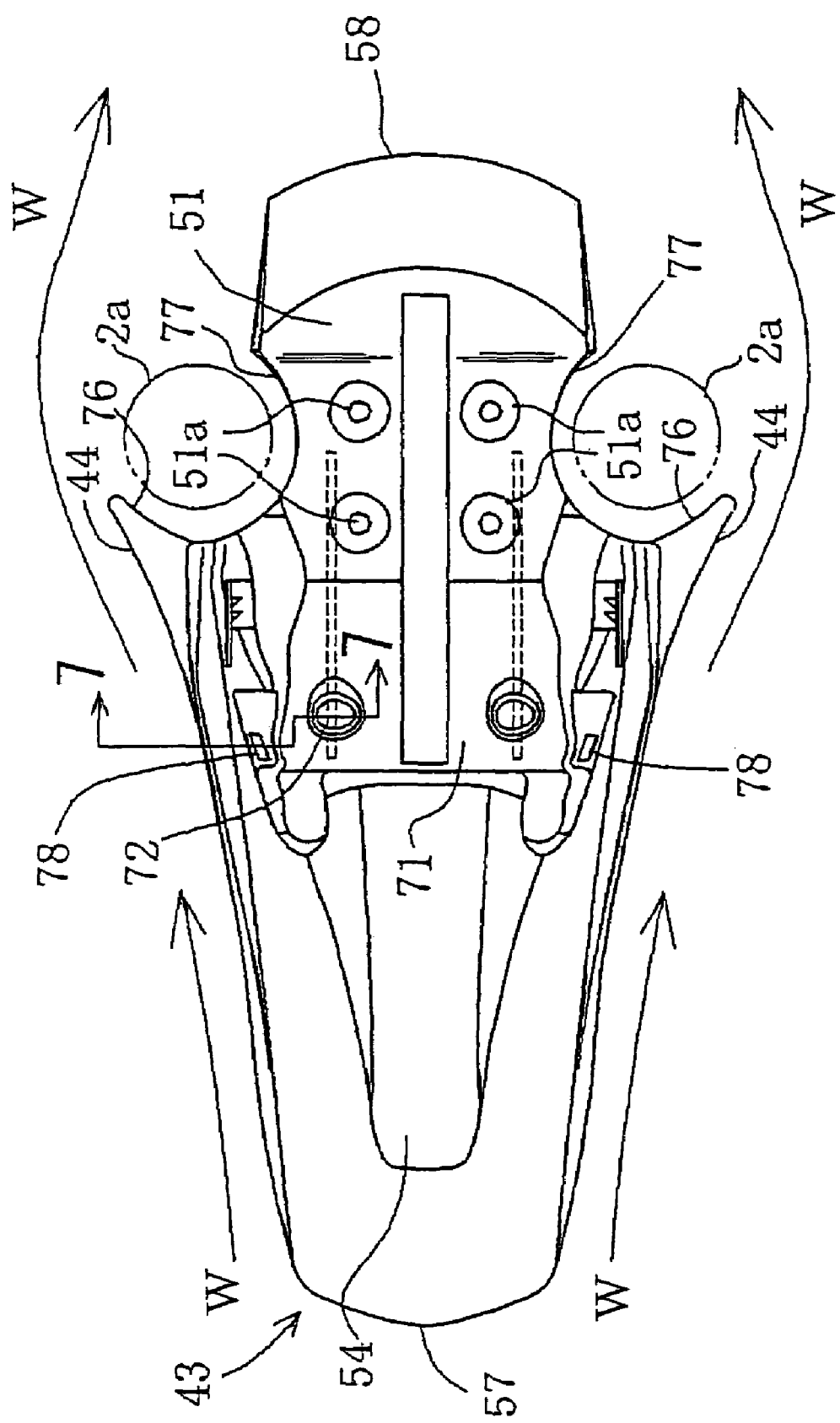
FIG. 6 is a plan view of the upper fender.

FIG. 6 is a plan view showing the upper surface of the upper fender 43. On both right and left sides of the rear portion 51, there are formed semicircular recesses 77 which are recessed in a generally semicircular shape toward the central side in the transverse direction. The upper forks 2a are passed, respectively, through spaces formed between the semicircular recesses 77 and the curved surfaces 76 of the cover portions 44 opposed thereto. In the region of the rear portion 51 sandwiched in between the right and left semicircular recesses 77 there are formed a plurality of bosses serving as the mounting portions 51a. Further, a pair of engaging slots 78 are formed in both right and left side portions as outside portions of the pair of bosses 72 which are positioned in front of the mounting portions 51a.

Figure 7:
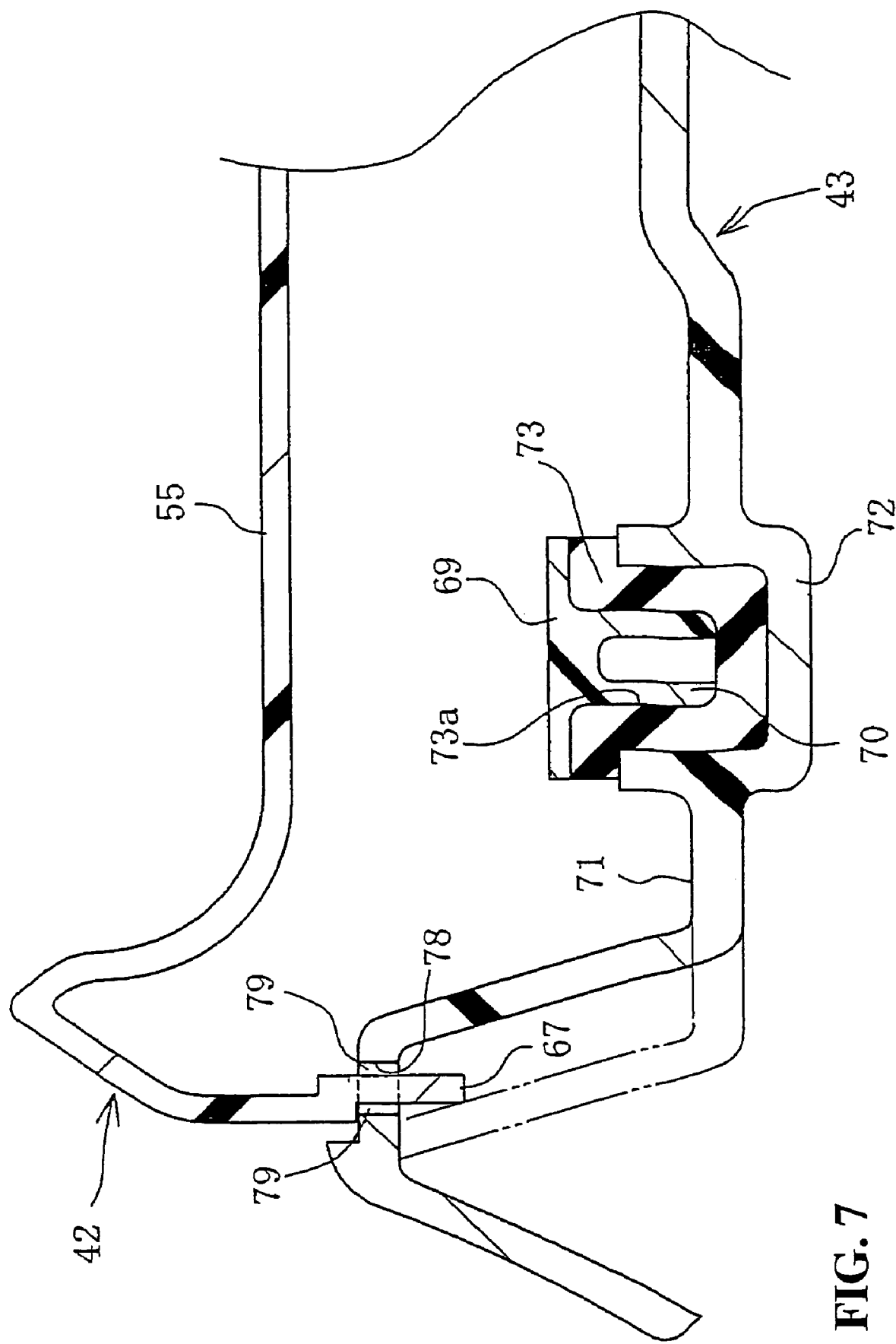
FIG. 7 is a sectional view showing a structure of engagement between the visor and the upper fender.

FIG. 7 is a sectional view taken on line 7-7 in FIG. 6, showing a structure of engagement between the visor 42 and the upper fender 43 on a larger scale. The bosses 72 are formed in an upwardly open state in the stepped portion 71 and the rubber cushions 73 are fitted in the bosses 72. The rubber cushions 73 are each in a generally cylindrical shape, and by fitting the engaging projections 70 respectively into holes 73a formed centrally of the rubber cushions 73, the lower portion 55 of the visor 42 is locked to the upper fender 43 in a vibration isolating manner.

By inserting the retaining tongue pieces 67 into the engaging slots 78 from above, lugs 79 (see FIG. 8) formed within the engaging slots 78 push side surfaces of the retaining tongue pieces 67 from both sides and are engaged therewith firmly. The retaining tongue pieces 67 are bent in a crank shape in section and their inwardly bent front ends are fitted in the engaging slots 78.

Figure 8:
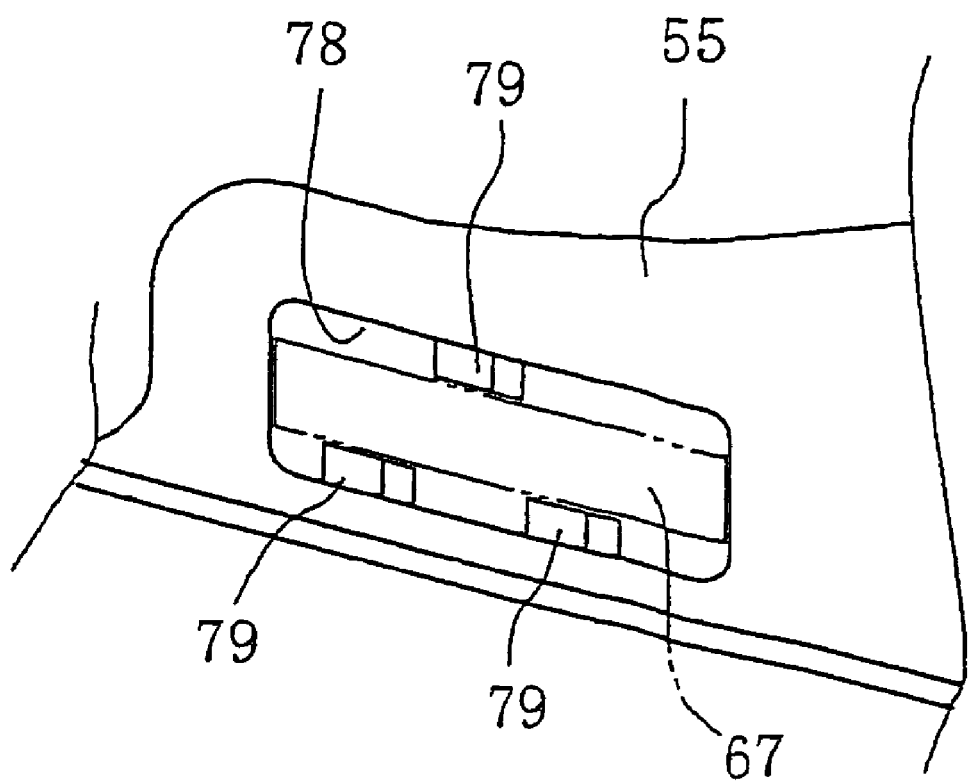
FIG. 8 is a diagram showing an engaging slot on a larger scale.

FIG. 8 shows the engaging slots 78 on a larger scale. A plurality of lugs 79 are formed on opposed wall surfaces of each engaging slot 78 integrally in an alternate manner so as to extend toward the central side. The engaging slots 78 are formed a little larger than the fitting portions of the retaining tongue pieces 67 to facilitate insertion therein of the retaining tongue pieces 67. Further, the mounting is ensured by frictional engagement of the lugs 79 with the retaining tongue pieces 67.

Figure 9:
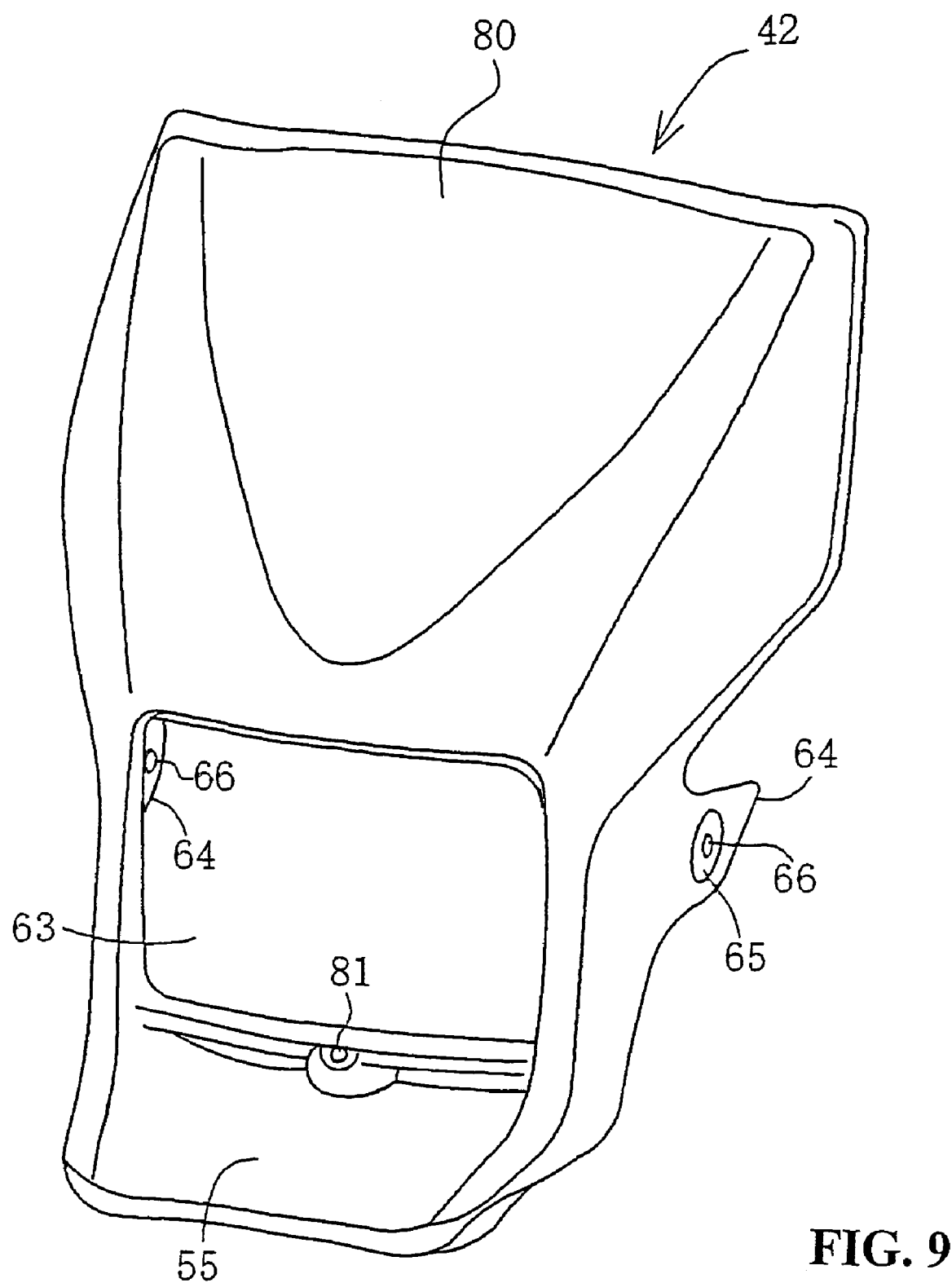
FIG. 9 is a perspective view of the visor.
Figure 10:
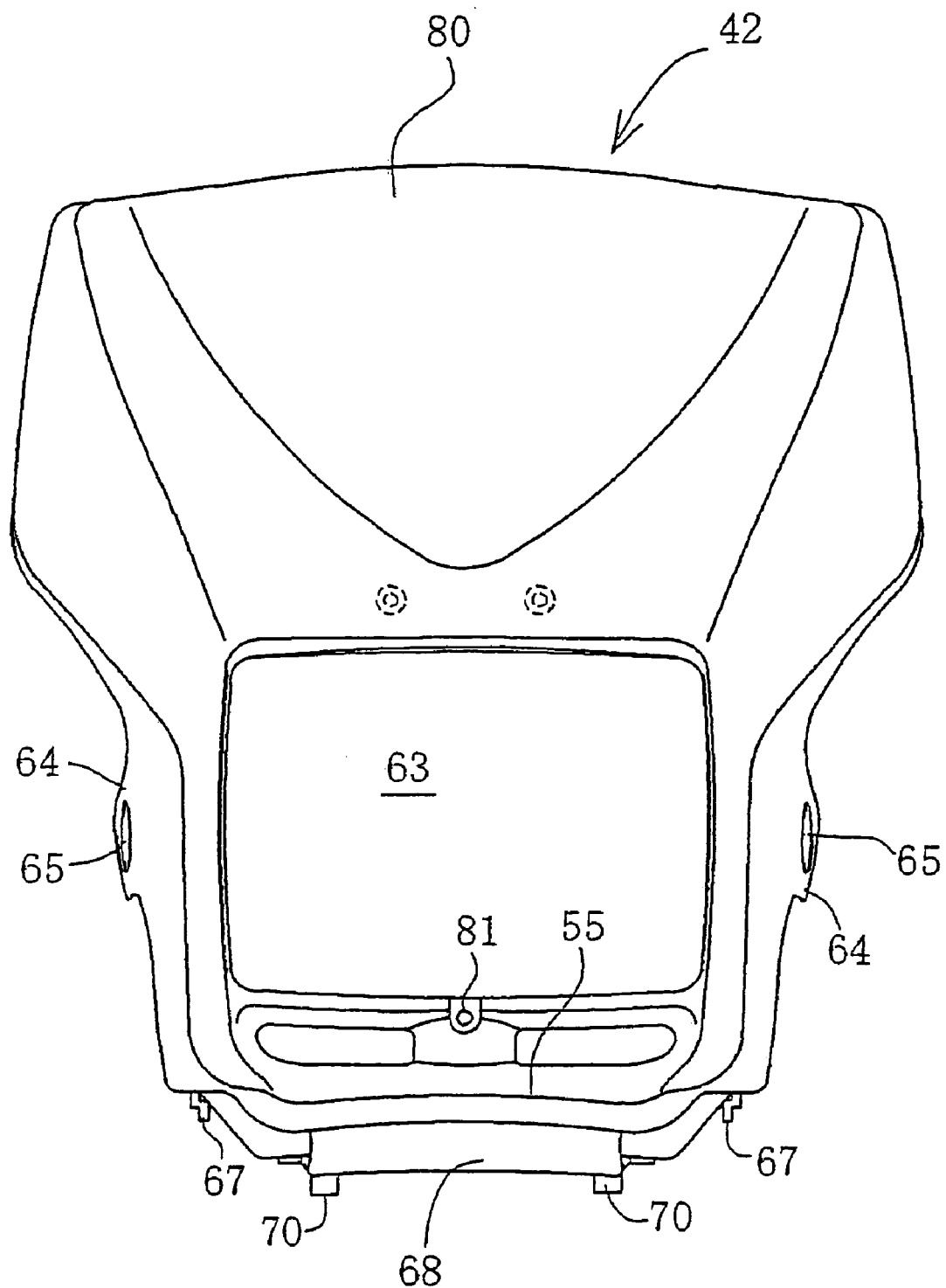
FIG. 10 is a front view of the visor.

FIG. 9 is a perspective view of the visor 42 and FIG. 10 is a front view thereof. In FIGS. 9 and 10, the mounting portions 64 are provided in a pair of right and left portions. A screen portion 80 is provided together with a boss 81 for mounting an aiming adjusting bolt. As is seen from FIG. 10, the flow uniforming surface 68 is formed at a lower central position of the lower portion 55 and the retaining tongue pieces 67 are formed right and left of somewhat higher portions located on the right and left sides of the lower central position.

Figure 11:
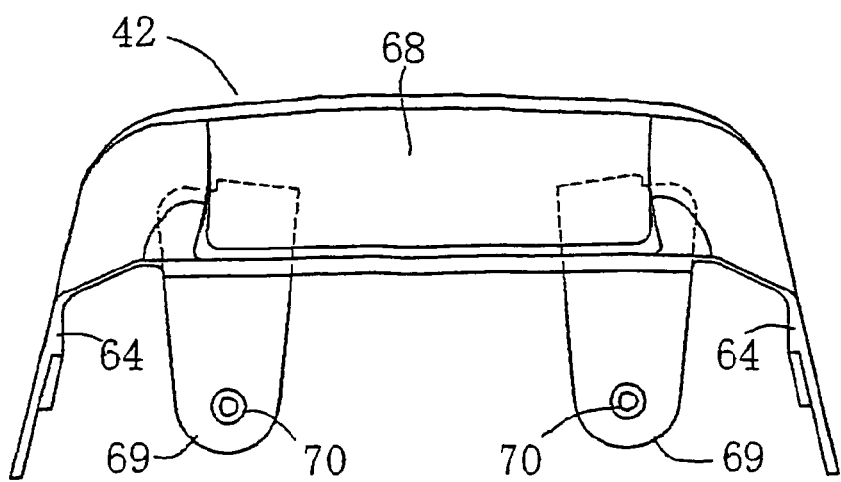
FIG. 11 is a bottom view of the visor.

FIG. 11 is a bottom view of the visor 42, in which mounting pieces 69 are provided in a pair of right and left pieces projecting rearwardly from the flow uniforming surface 68. Engaging projections 70 are formed integrally at rear ends of the mounting pieces 69.

Figure 12:
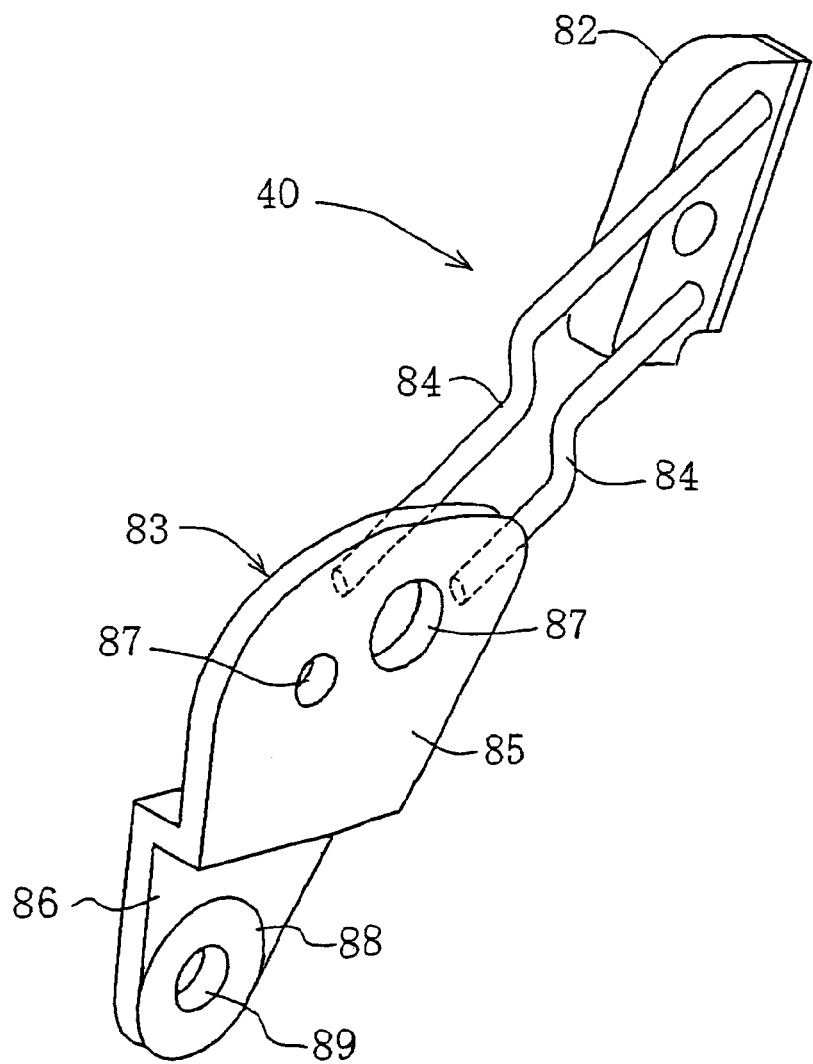
FIG. 12 is a perspective view of a winker bracket.

FIG. 12 is a perspective view of each winker bracket 40. The winker bracket 40 includes an upper plate 82 and a lower plate 83 which are united by being welded to both ends of a pair of upper and lower wires 84. The lower plate 83 is stepped to provide an upper portion 85 and a lower portion 86. End portions of the wires 84 are welded to the upper portion 85, and mounting holes 87 for the associated front winker 39 are formed in the upper portion 85. A seat 88 is provided on the lower portion 86 and a through hole 89 is formed in the seat 88.

Figure 13:
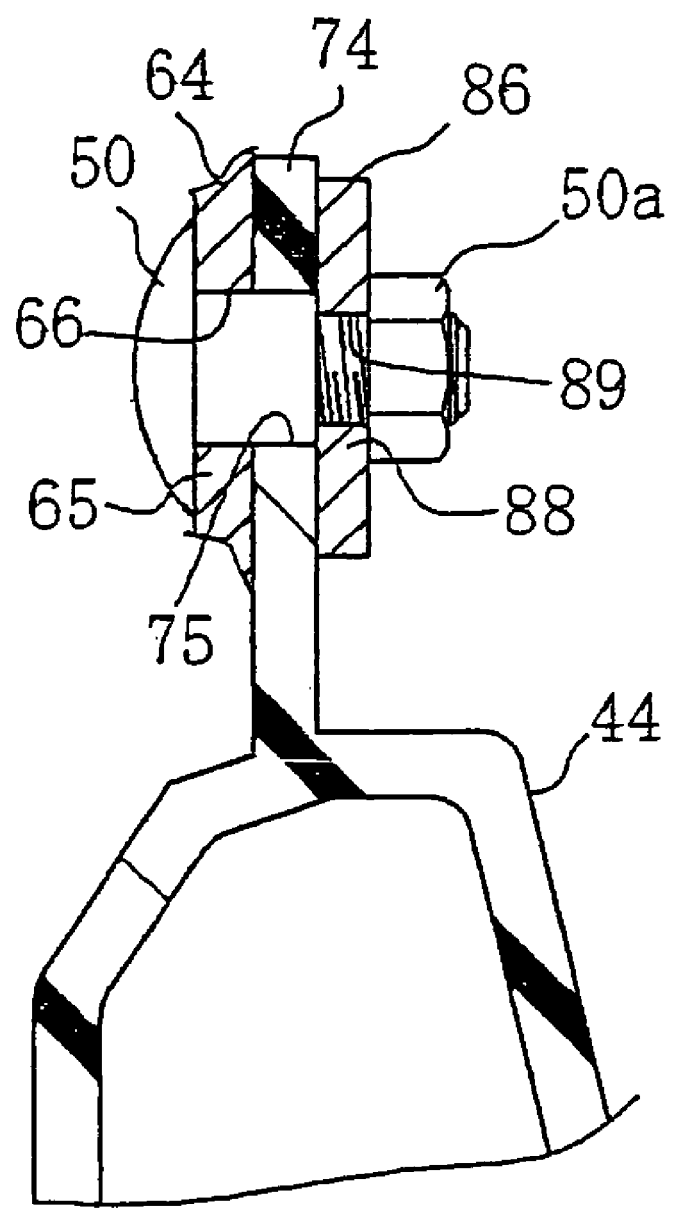
FIG. 13 is a sectional view showing a jointly fastening structure for the winker bracket.

FIG. 13 is a sectional view showing a mounting structure for mounting the visor 42 and the upper fender 43 to the seat 88 of the lower portion 86. The mounting portion 74 of each cover portion 44 in the upper fender 43 and the seat 65 of the associated mounting portion 64 in the visor 42 are superimposed on the outside of the seat 88. The through holes 66, 75 and 89 are aligned with one another, then a bolt 50 is inserted into the through holes from the outside, and a nut 50a is brought into threaded engagement with the threaded portion of the bolt 50 from the seat 88 side as the inner side to fasten the three components together.

A description will now be given of the operation. The lower portion 55 of the visor 42 overlaps the upper surface of the upper fender 43 and the flow uniforming surface 68 overlies the stepped portion 71, covering the front and upper portions of the air guide port 53. As a result, in front of the air guide port 53, there is formed an air guide path 56 surrounded with the fender recess 54 and the flow uniforming surface 68. Consequently, the flow of air W flows from the air guide path 56 rearwardly through the air guide port 53 to cool the engine 7. At this time, since the flow of air is given directivity so as to advance toward the engine 7 by means of the air guide path 56, the air volume for cooling the engine 7 increases and thus the engine can be cooled efficiently.

When in this state the front wheel 1 rotates in the direction of arrow A, muddy water splashed up in a tangential line direction by the front wheel 1 is blocked by the lower fender 45 so as to not reach the upper fender 43. That is, since the air guide port 53 formed in the upper fender 43 is positioned within the range sandwiched in between the tangential lines L1 and L2 of the front wheel 1 passing through the front end 60 and rear end 62 of the lower fender 45, the lower fender 45 blocks muddy water within this range and prevents the entry of muddy water into the air guide port 53 and the air guide path 56. Thus, with the air guide port 53, not only can the engine 7 be cooled but also the entry of muddy water can be prevented at the same time.

Moreover, since the fender is divided into the upper-fender 43 and the lower fender 45, it is possible to reduce the size of the upper fender 43. Since the upper fender 43 positioned in front of the engine 7 is thus reduced in size, it becomes easier to conduct a flow of air to the engine 7.

More particularly, since the front end 60 of the lower fender 45 extends up to near the top TP of the front wheel 1, the tangential line L1 passing through the front end 60 becomes nearly horizontal, so that the front end 57 of the upper fender 43 can be set to the rearmost position, whereby the upper fender 43 can be made still smaller in size and it becomes easier to send a flow of air to the engine 7.

In addition, since the upper portion of the air guide path 56 is formed by the flow uniforming surface 68 of the lower portion 55 and the lower portion of the air guide path 56 is formed by the fender recess 54 formed in the upper surface of the upper fender 43, the air guide path 56 can be formed by molding with use of a simple mold not requiring a core, despite the air guide path 56 being hollow as a whole. As a result, the manufacturing becomes easier and it is possible to attain a reduction of cost.

The side surface width of the upper fender 43 becomes gradually larger toward the upper forks 2a and the cover portions 44 expand upwardly to the greatest extent. Consequently, the flow uniforming surface becomes larger and a larger amount of a flow of air W can be made uniform. As shown in FIG. 6, the uniforming of flow can be done effectively by the side surfaces of the upper fender 43. In addition, since the cover portions 44 covers the front side of the upper forks 2a from the outside, the flow of air which has been made uniform by the side surfaces of the upper fender 43 can be allowed to flow smoothly toward the engine 7 without striking against the upper forks 2a.

Figure 14:
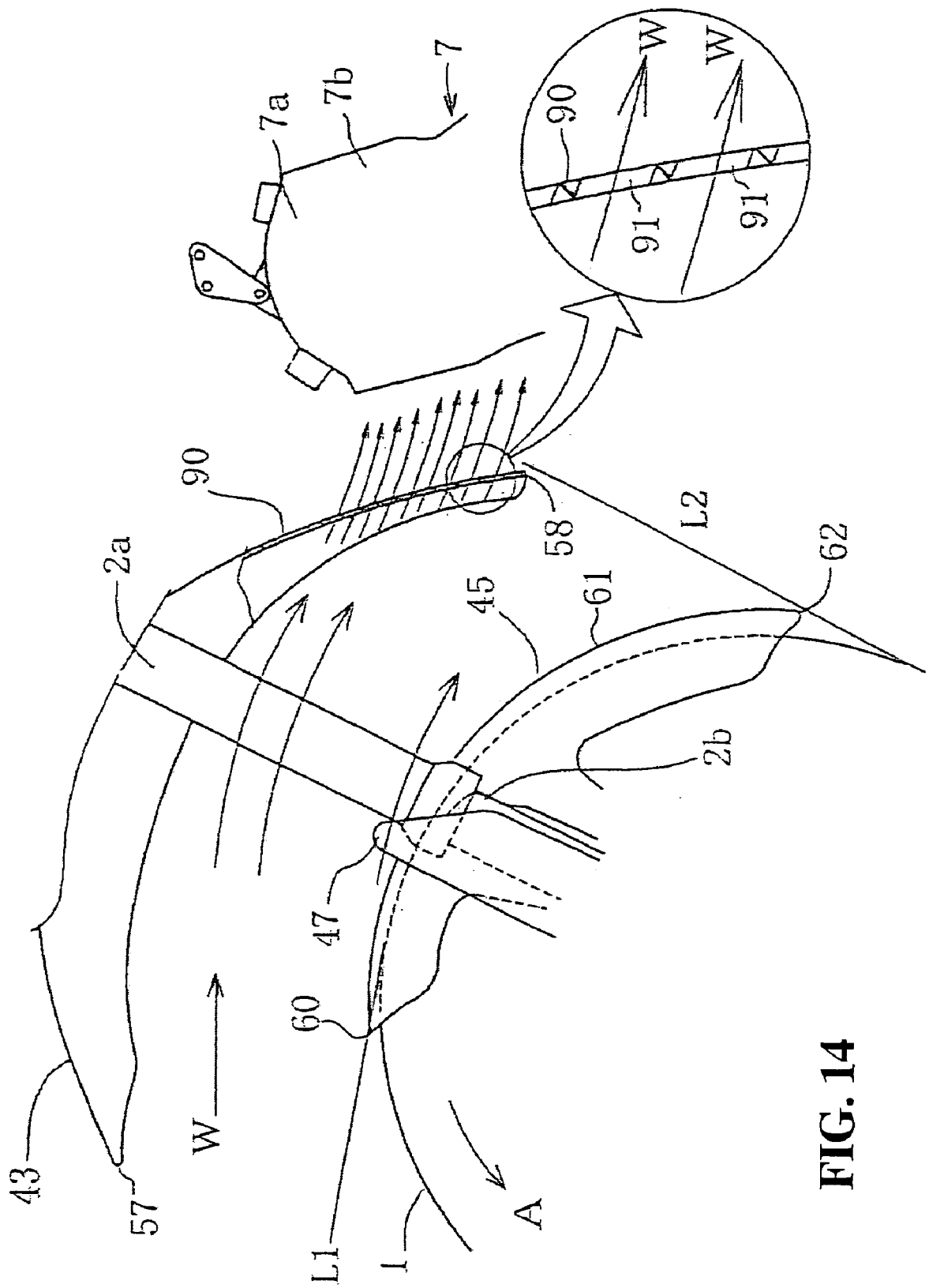
FIG. 14 shows another embodiment of the present invention.

FIG. 14 is a diagram corresponding to FIG. 3, showing another embodiment of the present invention. In this embodiment, portions common to the previous embodiment are identified by common reference numerals. In this embodiment, a rear portion 90 of the upper fender 43 extends longer and rearwardly up to the front side of the engine 7 and a plurality of air guide holes 91 facing towards the engine 7 are formed in the rear portion 90. On the other hand, the rear portion of the lower fender 45 extends longer and rearwardly so that the rear end 62 is located below the rear end 58 of the upper fender 43 and at a position to the rear and lower than in the previous embodiment. The rear end 62 is set so that the tangential line L2 passes near or behind the rear end 58 of the upper fender 43.

According to this construction, the flow of air W is allowed to flow to the engine 7 from the air guide ports 91 formed near the engine and can cool the engine. Thus, the flow of air can be guided and concentrated on the vicinity of the engine 7, whereby the cooling efficiency can be further increased. At this time, by positioning the rear end 62 of the lower fender 45 in such a manner that the tangential line L2 passes behind the rear end 58 of the upper fender 43, the entry of muddy water splashed up in the tangential line direction by the front wheel 1 into the air guide ports 91 can be prevented as in the previous embodiment.

Additionally, by extending the rear portion 90 of the upper fender 43 up to a rear and lower position, it becomes possible to cool a lower position, whereby the degree of layout freedom of the engine 7 can be increased. Also in this case the same air guide port 53 as in the previous embodiment may be formed in the upper fender 43.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In a motorcycle including a pair of right and left front forks for supporting a front wheel, a fender for covering an upper portion of the front wheel, and an engine supported by a body frame at a position behind the front forks, the front forks each comprising an upper fork as a portion fixed to the body frame and a lower fork as a portion fixed to the front wheel, the fender comprising:
a vertically divided upper fender and lower fender, the upper fender being secured to the upper forks and the lower fender being secured to the lower forks;
an air guide port for guiding a flow of air to said engine is formed in said upper fender, said air guide port being positioned within a range in which muddy water splashed up in a tangential line direction by the front wheel is blocked by said lower fender.

2. The fender structure for a motorcycle according to claim 1, wherein a visor is provided so as to be superimposed on said upper fender, a lower surface of said visor covers a part of an upper surface of said upper fender and a part of a fender recess formed in front of said air guide port, and an air guide path for guiding a flow of air to said air guide port is formed by said fender recess and a lower portion of said visor.

3. The fender structure for a motorcycle according to claim 2, wherein a front end of said lower fender is positioned between a front end of said upper fender and said air guide port.

4. The fender structure for a motorcycle according to claim 2, wherein said lower fender is curved along an outer periphery of said front wheel from near the top of the front wheel and extends rearwardly.

5. The fender structure for a motorcycle according to claim 1, wherein said upper fender gradually becomes wider from the front side of the vehicle toward said front forks so as to cover front portions of the front forks, and both side surfaces of the upper fender expand upward.

6. The fender structure for a motorcycle according to claim 2, wherein said upper fender gradually becomes wider from the front side of the vehicle toward said front forks so as to cover front portions of the front forks, and both side surfaces of the upper fender expand upward.

7. The fender structure for a motorcycle according to claim 3, wherein said upper fender gradually becomes wider from the front side of the vehicle toward said front forks so as to cover front portions of the front forks, and both side surfaces of the upper fender expand upward.

8. The fender structure for a motorcycle according to claim 4, wherein said upper fender gradually becomes wider from the front side of the vehicle toward said front forks so as to cover front portions of the front forks, and both side surfaces of the upper fender expand upward.

9. The fender structure for a motorcycle according to claim 1, wherein said upper fender includes forwardly projecting mounting portions with left and right cover portions extending upwardly therefrom for mating with mounting portions of a visor that project downwardly from the visor.

10. The fender structure for a motorcycle according to claim 1, wherein the upper fender includes an upper surface with a recess formed centrally thereof and extending in a longitudinal direction of said upper fender for forming a flow uniforming surface for directing a flow of air to said air guide port.

11. A fender assembly adapted to be used with a motorcycle comprising:
an upper fender adapted to be connected to an upper portion of a front fork of a motorcycle;
a lower fender adapted to be connected to a lower portion of a front fork of a motorcycle;
an air guide port for guiding a flow of air to an engine, said air guide port being formed in said upper fender and being positioned within a range in which muddy water splashed up in a tangential line direction by a front wheel is blocked by said lower fender.

12. The fender assembly adapted to be used with a motorcycle according to claim 11, wherein a visor is provided so as to be superimposed on said upper fender, a lower surface of said visor covers a part of an upper surface of said upper fender and a part of a fender recess formed in front of said air guide port, and an air guide path for guiding a flow of air to said air guide port is formed by said fender recess and a lower portion of said visor.

13. The fender assembly adapted to be used with a motorcycle according to claim 12, wherein a front end of said lower fender is positioned between a front end of said upper fender and said air guide port.

14. The fender assembly adapted to be used with a motorcycle according to claim 12, wherein said lower fender is curved along an outer periphery of said front wheel from near the top of the front wheel and extends rearwardly.

15. The fender assembly adapted to be used with a motorcycle according to claim 11, wherein said upper fender gradually becomes wider from the front side of the vehicle toward said front forks so as to cover front portions of the front forks, and both side surfaces of the upper fender expand upward.

16. The fender assembly adapted to be used with a motorcycle according to claim 12, wherein said upper fender gradually becomes wider from the front side of the vehicle toward said front forks so as to cover front portions of the front forks, and both side surfaces of the upper fender expand upward.

17. The fender assembly adapted to be used with a motorcycle according to claim 13, wherein said upper fender gradually becomes wider from the front side of the vehicle toward said front forks so as to cover front portions of the front forks, and both side surfaces of the upper fender expand upward.

18. The fender assembly adapted to be used with a motorcycle according to claim 14, wherein said upper fender gradually becomes wider from the front side of the vehicle toward said front forks so as to cover front portions of the front forks, and both side surfaces of the upper fender expand upward.

19. The fender assembly adapted to be used with a motorcycle according to claim 11, wherein said upper fender includes forwardly projecting mounting portions with left and right cover portions extending upwardly therefrom for mating with mounting portions of a visor that project downwardly from the visor.

20. The fender assembly adapted to be used with a motorcycle according to claim 11, wherein the upper fender includes an upper surface with a recess formed centrally thereof and extending in a longitudinal direction of said upper fender for forming a flow uniforming surface for directing a flow of air to said air guide port.

* * * * *